Aug. 20, 1957 A. EISELE 2,803,064
UNIVERSAL PRECISION WORK HOLDER FOR MACHINE TOOLS
Filed Oct. 22, 1952 3 Sheets-Sheet 2
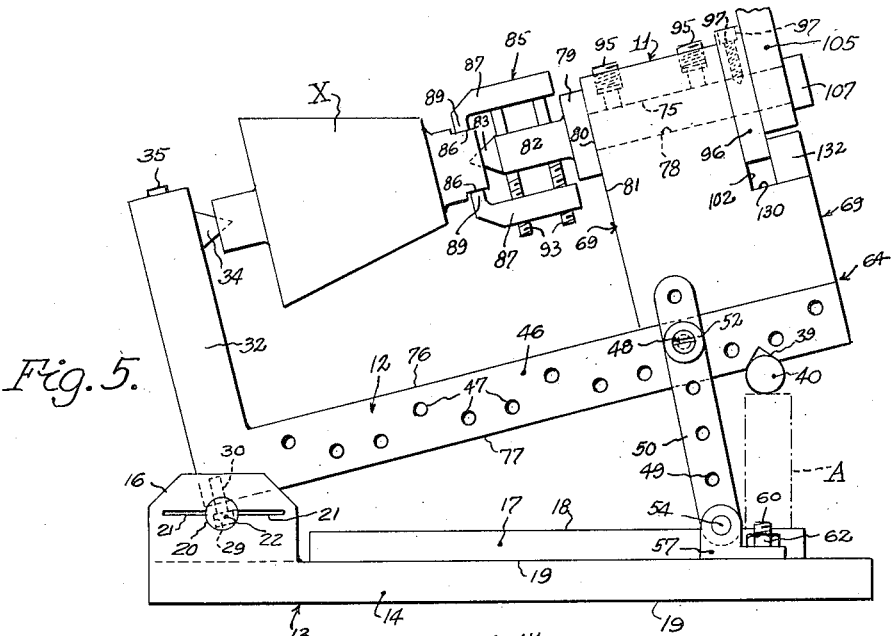
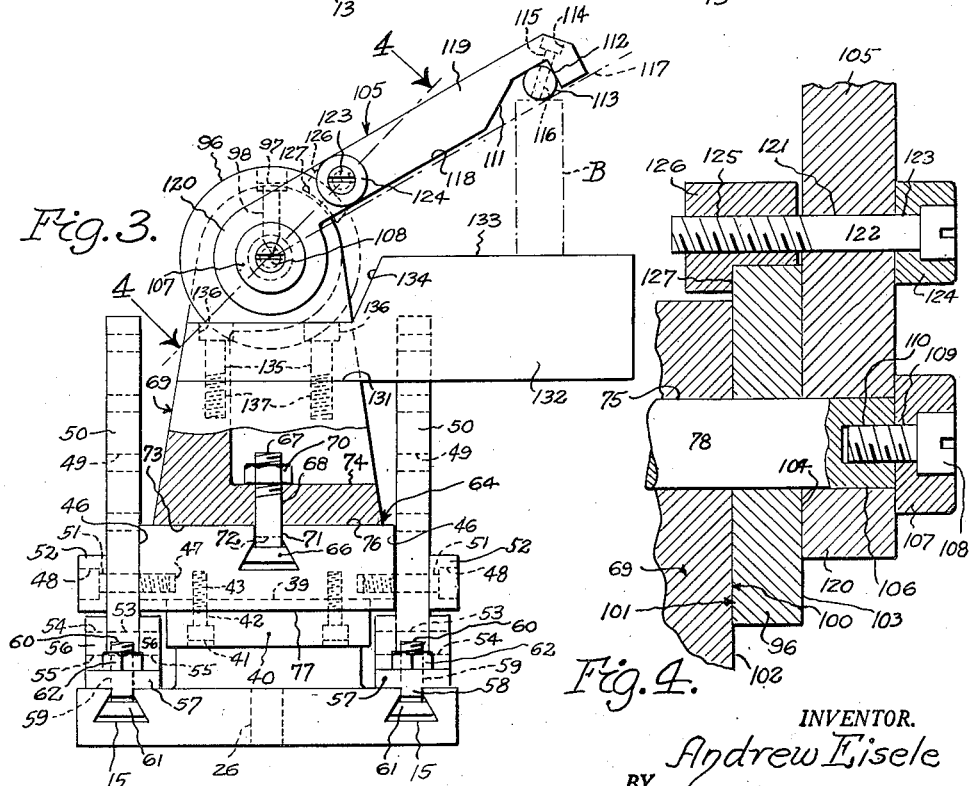
INVENTOR.
Andrew Eisele
BY Barthel & Bugbee
Attys Aug. 20, 1957  A. EISELE  2,803,064
UNIVERSAL PRECISION WORK HOLDER FOR MACHINE TOOLS
Filed Oct. 22, 1952  3 Sheets-Sheet 3
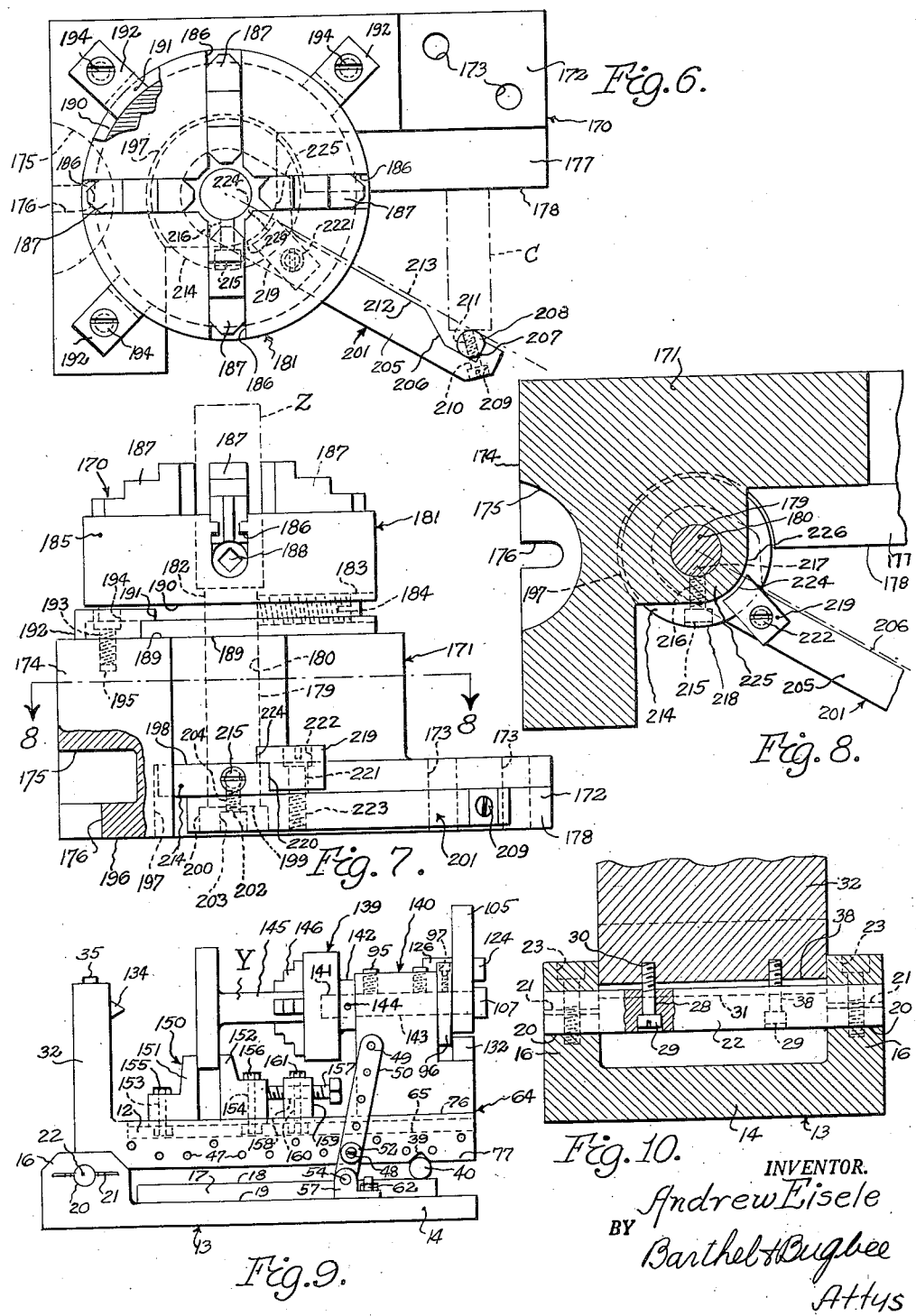
INVENTOR.
Andrew Eisele
BY Barthel & Bugbee
Attys

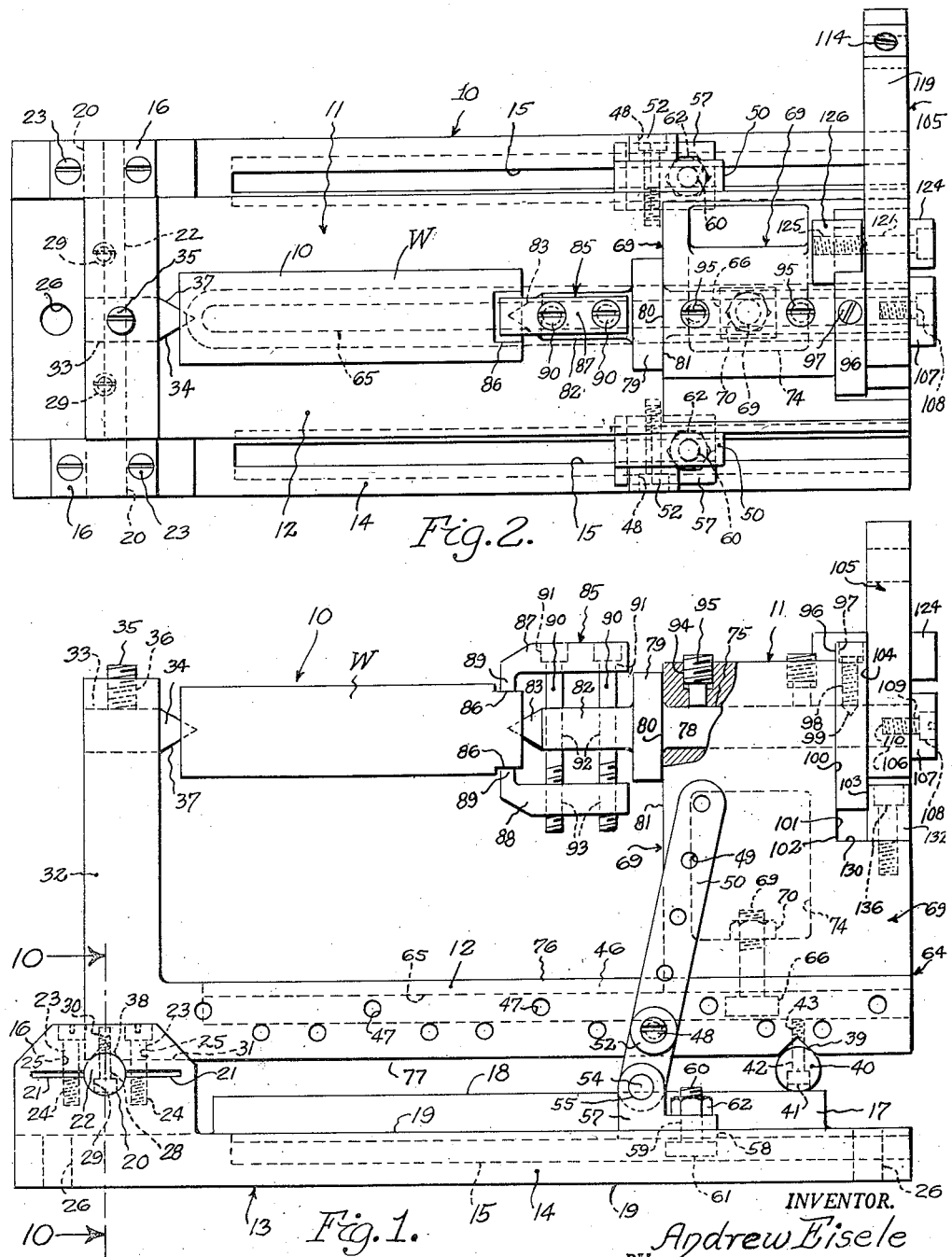

United States Patent Office 2,803,064
Patented Aug. 20, 1957

2,803,064

UNIVERSAL PRECISION WORK HOLDER FOR MACHINE TOOLS

Andrew Eisele, Detroit, Mich.

Application October 22, 1952, Serial No. 316,220

2 Claims. (Cl. 33—174)

This invention relates to machine tools and, in particular, to work holders for machine tools.

One object of this invention is to provide a universal precision work holder for machine tools which can be adjusted with extreme accuracy by means of precision gauge blocks to various positions.

Another object is to provide a universal precision work holder of the foregoing character wherein the workpiece may be precisely tilted, rotated or rotated and tilted in a precise manner by the use of gauge blocks.

Another object is to provide a universal precision work holder of the foregoing character wherein the workpiece can be precisely readjusted or indexed from one position to another to perform a plurality of operations on the workpiece at spaced locations thereon, these readjustments or indexing operations being performed with the use of precision gauge blocks.

Another object is to provide a universal precision work holder of the foregoing character which may be firmly held in its adjusted position, without danger of being shifted by the pressure of the cutter, grinding wheel or other tool operating upon the workpiece.

Another object is to provide a universal precision work holder of the foregoing character which may be used either in a horizontal or vertical position, according to the nature of the operation to be performed upon the workpiece and the type of machine tool to be used for that purpose.

Another object is to provide a universal precision work holder of the foregoing character having supplementary means for additionally supporting the workpiece to prevent springing or other undesired motion thereof during the machining operation.

Other objects and advantages of the invention will become apparent during the course of the following description of the accompanying drawings, wherein:

Figure 1 is a side elevation partly in vertical section of a universal precision work holder for machine tools, according to one form of the invention;

Figure 2 is a top plan view of the precision work holder shown in Figure 1;

Figure 3 is an end elevation, partly in section, of the work holder shown in Figures 1 and 2, adjusted by means of a precision gauge block shown in dotted lines;

Figure 4 is an enlarged fragmentary inclined section taken along the inclined plane 4—4 in Figure 3, showing the clamping mechanism for the sine bar of the work holder;

Figure 5 is a side elevation similar to Figure 1, but showing the work holder adjusted to another position by means of a precision gauge block shown in dotted lines, for tilting the workpiece longitudinally;

Figure 6 is a top plan view, partly in horizontal section, of a modification of the precision work holder of Figures 1 to 5 inclusive, adapted for use in a vertical position;

Figure 7 is a side elevation, partly in vertical section, of the modified precision work holder shown in Figure 6;

Figure 8 is a horizontal section taken along the line 8—8 in Figure 7, showing the mechanism for clamping the sine bar employed therewith;

Figure 9 is a side elevation of the precision work holder of Figures 1 to 5 inclusive equipped with an auxiliary work support for additionally supporting a workpiece so as to prevent springing thereof during machining; and Figure 10 is a vertical section taken along the line 10—10 in Figure 1, showing the pivot construction for the precision work holder.

In general, the universal precision work holder of the present invention (Figures 1 to 5 inclusive and 10) consists of a stationary lower base upon which a movable upper base is tiltably mounted, the upper base in turn carrying a pair of heads or brackets between which the workpiece is mounted, either between centers or in a chuck attached to a rotatable shaft. Tilting of the upper base is precisely brought about by means of precision gauge blocks, and tilting or rotation of the work supporting shaft in the head is also brought about by means of gauge blocks in order to index the workpiece from one position to another to machine the workpiece precisely at a plurality of locations separated angularly from one another. Additional support for a workpiece mounted in a chuck is provided as shown in Figure 9, in order to prevent springing of the workpiece during machining. A modification of the previous work holder of the invention, shown in Figures 6, 7 and 8, enables workpieces to be mounted in a vertical position and precisely indexed around a vertical axis.

Referring to the drawings in detail, Figures 1 to 5 inclusive, 9 and 10 show a universal precision work holder, generally designated 10, according to one form of the invention as consisting of a movable workpiece holding structure, generally designated 11, including a movable upper base or sine plate 12 tiltably mounted upon a stationary lower base, generally designated 13. The stationary lower base 13 consists of an elongated plate or block 14 provided with spaced parallel longitudinal dovetail grooves 15 and upstanding parallel brackets 16, the latter being located at one end of the lower base 13. Arranged between the dovetail grooves 15 on the plate 14 is an elongated boss 17 having a precisely-machined flat top contact or reference surface 18 which is parallel to the precisely-machined bottom surface 19 of the base 13.

The brackets 16 are provided with aligned horizontal bores 20 and also provided with horizontal slots 21 extending into the bores 20. Mounted in the aligned bores 20 is a pivot shaft 22 which is adapted to be clamped in position by clamping screws 23 disposed on opposite sides of the bores 20 (Figure 1) and threaded into screw holes 24 beneath the slots 21. Consequently, by loosening the clamping screws 23, the shaft 22 may be rotated, and by tightening the screws 23, the shaft 22 may be clamped in a fixed position. The screws 23 of course at their upper ends pass through smooth-walled holes 25 aligned with the threaded holes 24 and located in the upper half of each bracket 16 above its respective slots 21. The slots 21 enable yielding of the upper half of each bracket 16 relatively to the lower half for clamping purposes. The stationary lower base 13 is provided with bolt holes 26 by which the work holder 10 may be secured to the machine tool upon which it is used, as by T-bolts (not shown).

Intermediate the brackets 16 (Figure 10), the pivot shaft 22 is provided with spaced vertical screw holes 28 which receive screws 29 threaded into screw holes 30 in the bottom surface 31 of the movable base 12 directly beneath a fixed center support or tail-stock 32 which extends upward from the movable base 12 and is provided with a horizontal bore 33 in which is mounted a fixed center 34 clamped in position by a set screw 35 threaded through a transverse hole 36 opening into the bore 33. The fixed center 34 has a pointed end 37 upon which one end of a workpiece W is supported. The base 13 immediately above the pivot shaft 22 is provided with a downwardly-facing groove 38 into which the pivot shaft 22 is drawn upwardly by means of the screws 29.

Disposed parallel to the V-groove 38 and located near the opposite end of the movable upper base 12 is a second V-groove 39 (Figure 1) in which a gauge block contact shaft 40 is securely held, as by the set screws 41 passing through the holes 42 in the shaft 40 and threaded into the screw holes 43 (Figure 3), the construction being similar to that of the pivot shaft 22 in the V-groove 38. This arrangement is provided for holding a precision gauge block A (Figure 5) for positioning a workpiece X. The opposite sides 46 of the movable upper base 12 (Figures 1 and 3) are provided with longitudinally-spaced staggered screw holes 47 disposed at intervals along the upper base 12 and threaded to receive horizontal brace clamping screws 48 which are inserted through pairs of aligned holes 49 in swinging braces 50, the holes 49 being distributed at intervals along the length of the braces 50. The clamping screws 48 also pass through holes 51 in collars 52 which engage the braces 50 by means of which the braces 50 are firmly clamped against the sides 46 of the upper base 12. The holes 47 and 49 are provided in sufficient number and spacing to enable the braces 50 to be securely held in any position of tilt of the base 12 within the range of the work holder 10.

The braces 50 at their lower ends are bored transversely as at 53 (Figure 3) to receive pivot pins 54, the opposite ends of which are supported in aligned bores 55 in ears 56 rising from and forming a part of the brace brackets 57. Each of the latter is provided with an integral guide rib 58 fitting into the dovetail groove 15 and also with a vertical hole 59 for receiving dovetail-headed bolts 60, the heads 61 of which are configured to slide to and fro in the dovetail grooves 15 and locked in position by clamping nuts 62.

The movable upper base 12 is provided with a central longitudinal dovetail groove 65 parallel to the dovetail groove 15, all of which are perpendicular to the pivot shaft bores 20 and pivot shaft 22. Slidably mounted in the central dovetail groove 65 is the dovetail head 66 of a clamping bolt 67 which passes through a vertical hole 68 in a movable work holding head or head stock 69 which is held in position by a nut 70 threaded on the upper end thereof (Figure 3). The upper base 12 and the head stock 69 together form a frame structure, generally designated 64. The upper portion of the dovetail slot 65 is provided with parallel side walls 71 which serve to receive an elongated parallel-sided rib or tongue 72 integral with the head stock 69 and extending downwardly from the flat bottom surface 73 thereof. The head stock 69 is hollowed out as at 74 to provide access to the clamping nut 70 upon the clamping bolt 67.

The upper portion of the head stock 69 is provided with a horizontal bore 75 (Figure 1), the axis of which is parallel to the reference surface 76 on top of the movable base 12 along which the bottom surface 73 of the head stock 69 slides, the reference surface 76 being also parallel to the bottom surface 77 of the movable base 12. Rotatably mounted in the bore 75 is a rotatable work holding shaft 78 having an intermediate enlarged portion or annular flange 79, the rearward surface 80 of which is engageable with the adjacent surface 81 of the head stock 69. Projecting forwardly from the enlargement 79 is the continuation or rotatable center portion 82 of the work holding shaft 78. The rotatable center portion 82 is analogous to the so-called "live center" of a lathe and has a pointed end 83 which engages the opposite end of the workpiece W from the fixed center 34, the latter being analogous to the so-called "dead center" of the lathe. The bore 75, shaft 78 and pointed end 83 of the rotatable center portion 82 are, of course, coaxial with the fixed center 34 and its pointed end 37.

The workpiece W is drivingly connected to the rotatable or live center 82 in any suitable way, the way shown in the drawings being by means of a clamping dog, generally designated 85, which engages parallel flat portions 86 on the opposite sides of the adjacent ends of the workpiece W. The clamping dog 85 consists of a pair of L-shaped oppositely-facing clamping arms 87 and 88, the nose portions 89 of which engage the flat portions 86 of the workpiece W. Clamping screws 90 pass through countersunk bores 91 in the clamping arm 87, likewise pass snugly but slidably through smooth-walled bores 92 in the rotatable or live center 82 and are threaded into the threaded bores 93 in the clamping arm 88. In this manner, by tightening the screws 90, the arms 87 and 88 are brought into clamping engagement with the workpiece W through the engagement of their nose portions 89 with the flat portions 86, and rotary motion of the rotatable or live center 82 is accordingly transmitted accurately to the workpiece W. In order to clamp the shaft 78 in its adjusted position, the head stock 69 is provided with threaded bores 94 communicating with the bore 75 and having threaded studs or headless set screws 95 threaded therein into engagement with the shaft 78.

Mounted on the opposite end of the work supporting shaft 78 from the enlargement 79 is a collar or disc 96 (Figure 4) which is held in position by the set screw 97 threaded through the radial threaded bore 98 and having a pointed lower end engaging a conical depression 99 in the shaft 78. The collar 96 has one surface 100 engaging the adjacent surface 101 of a cutaway portion 102 of the head stock 69 whereas its opposite surface 103 is engaged by the forward surface 104 of a sine bar 105, one end of which is bored as at 106 and thereby rotatably mounted on the outer end of the shaft 78. The sine bar 105 is retained in position by a collar 107 and a screw 108, the latter passing through a hole 109 in the collar 107 and threaded into a threaded hole 110 in the outer end of the shaft 78.

The outer end or free end of the sine bar 105 is provided with a cutaway portion 111 terminating in a V-notch 112 into which a contact rod or shaft 113 is drawn by a screw 114 passing through an oblique hole 115 therein and threaded into a threaded hole 116 in the contact shaft 113 (Figure 3). The construction and dimensions are such that the edge of the contact shaft 113 extends slightly outside the cutaway portion 111 and is tangent to a line 117 which passes through the axis of rotation of the work supporting shaft 78 and is substantially parallel to the lower edge 118 of the sine bar 105, the outer portion 119 of which is offset relatively to its hub portion 120. In order to clamp the sine bar 105 in position relatively to the shaft 78, the sine bar 105 is drilled as at 121 to receive a clamping screw 122 which passes through a countersunk hole 123 in a collar 124 and has its threaded end threaded into a threaded hole 125 in a clamping nut 126, the latter having an arcuate indentation or notch 127 engaging the collar 96.

In order to provide a support for a precision gauge block B, the shelf 130 of the cutaway portion 102 is engaged by the lower surface 131 of a fixed gauge block supporting arm or rest 132. The arm 132 is provided with an upper or reference surface 133 which is accurately machined to a plane surface passing through the center of rotation of the shaft 78. The inner end of the arm 132 is cut away as at 134 (Figure 3) in order to provide clearance for the hub 120 of the sine bar 105, and is drilled as at 135 to receive screws 136, the lower ends of which are threaded into threaded holes 137 in the head stock 69. In this manner the surface 131 of the fixed reference arm 132 is held firmly in engagement with the shelf surface 130 of the head stock 69.

In place of the live center 82 and clamping dog 85 for holding the workpiece W between the centers 82 and 34, a jaw chuck 139 may equally well be used, as shown in the modified precision work holder, generally designated 140, of Figure 9. The jaw chuck 139 has a bore 141 extending through it and its hub 142 for receiving the inner end of the shaft 143. The latter corresponds to the shaft 78 of Figures 1 to 5 inclusive, except that it lacks the live center portion 82 with its pointed end 83. The connection between the chuck 139 and the shaft 143 is made in any suitable manner, such as by threading or, as shown, by the use of a set screw 144. The workpiece Y shown in Figure 9 has a portion 145 held by the chuck jaws 146 in the usual manner. The chuck jaws 146 are moved radially outward and inward by screw mechanism described below in connection with the modification shown in Figures 6 and 7, and the portion 145 of the workpiece Y is centered in the chuck 139 in the usual way well known to mechanics.

Figure 9 also shows an auxiliary work supporting attachment, generally designated 150, for additionally engaging and holding the workpiece Y in addition to the jaw chuck 139 so as to prevent springing of the workpiece during the machining operations. The auxiliary supporting attachment 150 consists of a pair of L-shaped jaws 151 and 152 which are bored as at 153 and 154 to receive dovetail headed bolts 155 and 156 similar to the bolt 67 (Figure 3) and similarly engaging the dovetail groove 65 in the movable upper base 76. The jaw 152 is engaged and precisely adjusted by a horizontal adjusting screw 157 which is threaded through a threaded bore 158 in a block 159. The block 159 is provided with a vertical hole 160 for receiving a dovetail-headed clamping bolt 161 similar to the clamping bolts 155 and 156 and similarly engaging the dovetail slot 65. The holes 158 and 160 must, of course, be offset relatively to one another for clearance of the screw 157 relatively to the bolt 161. The modified precision work holder 140 shown in Figure 9 is otherwise the same as the form of the invention shown in Figures 1 to 5 inclusive and similar parts are similarly designated.

The modified precision work holder, generally designated 170, shown in Figures 6 to 8 inclusive, is adapted for holding a workpiece Z in a vertical position. The work holder 170 consists of a base block 171 or frame structure of approximately L-shaped construction and having an extension 172 projecting from one end thereof for accommodating bolt holes 173 for hold down bolts (not shown) by which the work holder 170 is clamped to the bed of the machine tool upon which it is used. The base block 171 includes a high L-shaped portion forming a head stock 174, one side of which is hollowed out as at 175 to give access to a holddown bolt (not shown) inserted in the vertical slot 176. One side of the base block 171 along the extension 172 is provided with a reference portion 177 having a vertical reference surface 178 for a precision gauge block C and accurately machined to a plane surface, a continuation of which passes through the axis of a vertical bore 179 which rotatably receives a vertical shaft 180. Mounted on the upper end of the shaft 180 is a jaw chuck, generally designated 181, having a bore 182 therein for receiving the shaft 180 and having a radially-directed threaded hole 183 opening into the bore 182 at right angles to the axis thereof and receiving a set screw 184 by which the chuck 181 is anchored to the shaft 180.

The chuck 181 includes a cylindrical block 185 (Figure 7) having radial slots or grooves 186 in which the jaws 187 are slidably mounted and moved to and fro by means of adjusting screws 188. The cylindrical block 185 forming the body of the chuck 181 near its bottom surface 189 is provided with a circumferential groove 190 which is engaged by the arcuate nose portions 191 of holddown members 192, the latter being drilled as at 193 to receive holddown or clamping screws 194 threaded into threaded holes 195 in the raised portion or high portion 174 of the base block 171.

The bottom surface 196 of the base block 171 is recessed as at 197 to provide an elevated surface 198 raised above the bottom surface 196, both of these surfaces being accurately machined to parallelism and also to perpendicularity relatively to the axis of the bore 179 and axis of rotation of the shaft 180. Secured to the lower end of the shaft 180, as by the collar 199 set into a countersink 200, is a sine bar 201 similar in construction to the sine bar 105 previously described. The inner end of the sine bar 201 which is provided with the countersink 200 is secured to the shaft 180 by a screw 202 passing through a countersunk bore 203 in the collar 199 into a threaded hole 204 in the lower end of the shaft 180.

The sine bar 201, as in the case of the sine bar 105, is provided with an outer arm portion 205 which is cut away as at 206 to provide a V-notch 207 in which a gauge block contact shaft or rod 208 for the gauge block C is secured as by the screw 209 passing through the hole 210 into the threaded hole 211 in the shaft 208. The construction is such that the shaft 208 projects slightly beyond the adjacent edge 212 of the arm portion 205 and is tangent to a line 213 passing through the axis of rotation of the shaft 180.

In order to clamp the sine bar 201 in its adjusted position, a disc or collar 214 is secured as by the screw 215 threaded through the threaded bore 216 thereof (Figure 8) into engagement with the recess 217 in the shaft 180. The disc 214 has a cylindrical periphery 218 which is engaged by a clamping dog 219 having a notch 220 therein to receive the periphery of the disc 214. The clamping dog 219 is bored as at 221 to receive a clamping screw 222, the lower end of which is threaded into a screw hole 223 in the sine bar 201. Consequently, when the screw 222 is tightened, the clamping dog 219 is drawn firmly into engagement with the clamping disc 214, firmly locking the sine bar 201 thereto. The clamping dog 219 is provided with an arcuate nose portion 224 and the boss 225 in which the shaft bore 179 is located is provided with a correspondingly arcuate edge portion 226 (Figure 8) in order to avoid contact between these parts as the sine bar 201 is swung to and fro.

In the operation of the precision work holder 10 shown in Figures 1 to 5 inclusive and 10, the lower or stationary base 13 is secured to the bed of the machine tool, such as a milling machine or grinder, by means of holddown bolts inserted through the holes 26 therein. The workpiece W is mounted between the centers 82 and 34 (Figure 1) and clamped in position by means of the clamping dog 85. Assuming that the workpiece W is to be cut or ground at a plurality of positions spaced at intervals around its periphery, the workpiece W is set for its first position by releasing the clamping screws 95 and the sine bar clamping screw 122, thereby permitting the workpiece supporting shaft 78, clamping dog 85, and workpiece W to be rotated freely by hand until the starting point or first machine location is properly presented to the machining tool, such as a milling cutter or grinding wheel. It is assumed, of course, that this position has been properly laid out on the workpiece in a conventional way well-known to mechanics.

With the workpiece W properly positioned for the first cut or grind, the operator tightens the clamping screws 95 to lock the shaft 78 in its adjusted position (Figure 1), then swings the sine bar 105 downward until its contact shaft 113 engages the contact surface 133 (Figure 3) of the arm 132, whereupon he clamps the sine bar 105 in this zero or starting position by tightening the clamping screw 122. The operator then makes the first cut or grind on the workpiece W.

The operator then selects the proper gauge block B corresponding to the sine of the angle through which he is to rotate the workpiece W in order to bring it to the position desired for the second cut or grind. After loosening the clamping screws 95 to release the shaft 78, he swings the sine bar 105 upward, inserts the gauge block B between the surface 133 on the arm 132 and the contact shaft 113 on the sine bar 105 (Figure 3). When these members are properly in contact, the workpiece W has been properly rotated or indexed to its new position, whereupon the operator again tightens the clamping screws 95 and performs the machining operation on the new position or second position of the workpiece W. When this has been done, he again releases the sine bar clamping screw 122 while holding the work supporting shaft 78 tightly clamped, removes the gauge block B if he has not already done so, swings the sine bar 105 again downward to its zero position where the contact shaft 113 engages the surface 133 of the arm 132 and again retightens the sine bar clamping screw 122 with the sine bar again in its zero position.

If the third cut or grind is to be made in a position spaced circumferentially the same angle from the second position as the second position was from the first position, as is frequently the case, the operator again loosens the clamping screws 95 to release the shaft 78 and again swings the sine bar 105 upward to rotate the shaft 78 and workpiece W to its third position, again inserting the gauge block B in the manner previously described, and as shown in Figure 3, retightening the clamping screws 95 to lock the shaft 78 and workpiece W in the third position when the gauge block B rests upon the arm surface 133 and the sine bar contact shaft 113 rests upon the gauge block B. The operator then makes the third cut or grind. If, however, the third cut or grind is to be made in a position spaced a different angle from the second cut or grind, then the second cut or grind is circumferentially spaced from the first cut or grind, the operator selects a different gauge block B corresponding to the sine of the desired angle of rotation of the shaft 78 and workpiece W to bring it into the desired position, using it in the same way to set the sine bar 105. The procedure is repeated as many times as there are cuts or grinds to be made.

If the workpiece X is to be machined in an axially-tilted position (Figure 5), the operator removes the screws 48 from the braces 50 and also loosens the nuts 62 on the bolts 60. If the pivot shaft 22 is not sufficiently movable in its bores 20 in the brackets 16, he loosens the clamping screws 23 slightly to permit this. He then selects a gauge block A which corresponds to the sine of the angle through which he wishes to tilt the axis of the workpiece X relatively to the reference surface 18, swings the movable workpiece holding structure 11 upward until he can insert the gauge block A between the reference surface 18 and the contact shaft 40. He permits the latter and the structure it supports to rest upon the gauge block A (Figure 5) while he swings the braces 50 and moves the brace brackets 57 longitudinally along the dovetail grove 15 until he is able to reinsert the screws 48 in a new hole 47 in the movable base 12, whereupon he tightens the nuts 62 and screws 48 to lock the braces 50 solidly in their supporting position shown in Figure 5. Indexing operations to rotate the workpiece X around its axis of rotation are made in the manner described above in connection with Figures 1 to 5 inclusive, hence require no repetition. In this manner, for example, a frusto-conical workpiece such as the workpiece X may also be machined at circumferentially-spaced locations with cuts or grinds which are tilted angularly relatively to the axis thereof.

If a workpiece Y is more conveniently supported in a chuck, the modified position work holder 140 of Figure 9 is used. As previously stated, this is essentially the same as the workpiece holder 10 of Figures 1 to 5 and 10, except that a chuck 139 is substituted for the clamping dog 85. The workpiece holder 140 in other respects is adjusted and used in exactly the same manner as that described above for the workpiece holder 10, hence requires no repetition.

If, however, the workpiece Y requires additional support to prevent springing, the auxiliary work supporting attachment 150 is mounted on the movable upper base 12 as described in connection with the construction thereof, and the jaws 151 and 152 positioned by sliding them along the surface 76 until they properly engage the workpiece Y, whereupon their clamping bolts 155 and 156 are tightened to lock them in position. If it is desired to move the jaw 152 by small increments, the fine adjustment screw 157 is used, after first loosening the clamping bolt 156 of the jaw 152 and tightening the clamping bolt 161 of the block 159. When the desired adjustments have been made and the workpiece Y is properly supported between the jaws 151 and 152, the clamping bolt 156 is likewise tightened. This arrangement prevents springing of the workpiece during the machining operations and must of course be loosened when the workpiece Y is indexed to a new position in the manner described above in connection with Figures 1 to 5 inclusive and 10. The mode of operation is otherwise substantially the same as described in connection with those figures.

If a workpiece Z is to be supported and machined in a vertical position, such as, for example, to provide a plurality of angularly-spaced flutes in the end thereof, the precision work holder 170 of Figures 6 to 8 inclusive is employed, but the foregoing principles and general mode of operation apply. As before, the base block 171 is bolted to the bed of the machine tool, such as a milling machine or grinder, by inserting T-bolts in the holes 173 and slot 176, and the workpiece Z is properly centered in the chuck 181 by moving the jaws 187 by means of the screws 188 as in conventional lathe practice. The clamping screws 194 for the holddown members 192 are loosened, likewise the clamping screw 222 for the sine bar 205 (Figure 8). The workpiece Z is set in its first position with the gauge-contacting shaft 208 engaging the reference surface 178 as a zero or starting position (Figure 6), whereupon the clamping screws 194 and 222 are tightened and the first cut or grind is made on the upper end of the workpiece Z. It will be understood, of course, that this apparatus can also be used to make cuts or grinds on the sides of the upper end portion of the workpiece Z in a similar manner to that described in machining the upper end thereof.

Having made the first cut or grind, the operator loosens the holddown member clamping screws 194 so as to release the holddown members 192 from their clamped positions, while leaving the sine bar clamping screw 222 and clamping dog 219 tightened. Having selected a gauge block C corresponding to the sine of the angle through which he desires to swing the workpiece Z to the next cutting or grinding position, the operator swings the sine bar 205, disc 214, shaft 180, chuck 181 and workpiece Z to its new position, inserts this gauge block C in the manner shown in Figure 6 with one end engaging the reference surface 178 and the other end engaging the contact shaft 208, and then tightens the holddown member clamping screws 194 to cause the holddown members 192 to lock the chuck 181 and workpiece Z in its new position.

The cut or grind is then taken for the second position, after which the chuck 181 and workpiece Z are indexed to their third position and to subsequent positions by means of the sine bar 205 and gauge block C in a manner analogous to that described above in connection with Figure 3. If equal angular circumferential intervals are to be indexed on the workpiece Z, the same gauge block C is used for each resetting operation, whereas if a different angular interval is to be indexed, a different gauge block C corresponding to the sine of the desired angular interval is used as described above.

What I claim is:

1. A vertical universal precision work holding and positioning fixture comprising a base having a bottom surface thereon adapted to rest upon and be secured to the work table of a machine tool and having an upstanding portion rising from said base, a shaft rotatably mounted in said upstanding portion upon an axis of rotation substantially perpendicular to said bottom surface, said base having a recess therein in the lower portion thereof, a sine bar abutment drivingly secured to said shaft within said recess, a sine bar loosely and rotatably mounted on said shaft adjacent said abutment and swingable to and fro horizontally in said recess, a clamping device mounted on said sine bar in releasable locking engagement with said abutment, said base having a gauge block rest thereon disposed substantially perpendicular to said bottom surface, said sine bar having a gauge block contact member thereon aligned with said gauge block rest, and a work carrier mounted on the upper portion of said shaft above said upstanding portion for rotation with said shaft.

2. A vertical universal precision work holding and positioning fixture comprising a base having a bottom surface thereon adapted to rest upon and be secured to the work table of a machine tool and having an upstanding portion rising from said base, a shaft rotatably mounted in said upstanding portion upon an axis of rotation substantially perpendicular to said bottom surface, said base having a recess therein in the lower portion thereof, a sine bar abutment drivingly secured to said shaft within said recess, a sine bar loosely and rotatably mounted on said shaft adjacent said abutment and swingable to and fro horizontally in said recess, a clamping device mounted on said sine bar in releasable locking engagement with said abutment, said base having a gauge block rest thereon disposed substantially perpendicular to said bottom surface, said sine bar having a gauge block contact member thereon aligned with said gauge block rest, and a work carrier mounted on the upper portion of said shaft above said upstanding portion for rotation with said shaft, said recess extending inwardly from one side of said base above the level of said bottom surface and said sine bar being disposed in said recess above the level of said bottom surface.

References Cited in the file of this patent

UNITED STATES PATENTS

| | | |
|---|---|---|
| 1,295,982 | Hanton | Mar. 4, 1919 |
| 1,366,396 | Loeffler | Jan. 25, 1921 |
| 2,365,436 | Saucier | Dec. 19, 1944 |
| 2,386,880 | Osplack | Oct. 16, 1945 |
| 2,398,121 | Silvermaster | Apr. 9, 1946 |
| 2,451,588 | Techu | Oct. 19, 1948 |
| 2,501,148 | Weis | Mar. 21, 1950 |
| 2,504,961 | Bratten | Apr. 25, 1950 |
| 2,589,489 | Fuhr | Mar. 18, 1952 |
| 2,645,067 | Hinderer | July 14, 1953 |
| 2,664,641 | Parnet | Jan. 5, 1954 |
| 2,706,858 | King | Apr. 26, 1955 |

FOREIGN PATENTS

| | | |
|---|---|---|
| 569,002 | Great Britain | May 1, 1945 |
| 606,073 | Great Britain | Aug. 5, 1948 |